US012125456B2

(12) United States Patent
Agrawal et al.

(10) Patent No.: US 12,125,456 B2
(45) Date of Patent: Oct. 22, 2024

(54) AUTOMATIC INPUT STYLE SELECTION OR AUGMENTATION FOR AN EXTERNAL DISPLAY DEVICE

(71) Applicant: Motorola Mobility LLC, Chicago, IL (US)

(72) Inventors: Amit Kumar Agrawal, Bangalore (IN); Santhosh Kumar M S, Nagar (IN)

(73) Assignee: Motorola Mobility LLC, Chicago, IL (US)

( * ) Notice: Subject to any disclaimer, the term of this patent is extended or adjusted under 35 U.S.C. 154(b) by 54 days.

(21) Appl. No.: 18/174,898

(22) Filed: Feb. 27, 2023

(65) Prior Publication Data
US 2023/0222989 A1    Jul. 13, 2023

Related U.S. Application Data

(63) Continuation of application No. 17/399,779, filed on Aug. 11, 2021, now Pat. No. 11,594,193, which is a continuation of application No. 17/026,949, filed on Sep. 21, 2020, now Pat. No. 11,120,765.

(51) Int. Cl.
*G09G 5/00*      (2006.01)
*G06F 3/14*      (2006.01)

(52) U.S. Cl.
CPC .......... *G09G 5/003* (2013.01); *G06F 3/1407* (2013.01); *G06F 3/1438* (2013.01); *G09G 2360/06* (2013.01); *G09G 2370/22* (2013.01)

(58) Field of Classification Search
CPC . G06F 3/1407; G06F 3/1438; G09G 2360/06; G09G 2370/22
See application file for complete search history.

(56) References Cited

U.S. PATENT DOCUMENTS

| 11,120,765 | B1 | 9/2021 | Agrawal |
| 11,594,193 | B2 | 2/2023 | Agrawal et al. |
| 2010/0245210 | A1* | 9/2010 | Lee .......... G09G 5/008 345/2.1 |

(Continued)

OTHER PUBLICATIONS

"Corrected Notice of Allowability", U.S. Appl. No. 17/026,949, Aug. 18, 2021, 2 pages.

(Continued)

*Primary Examiner* — Abbas I Abdulselam
(74) *Attorney, Agent, or Firm* — FIG. 1 Patents

(57) ABSTRACT

An electronic device (e.g., smartphone) can be connected to an external display device, allowing the electronic device to display content on the external display device. The external display device can be a standalone display device or be part of another electronic device (e.g., a laptop or tablet). The electronic device supports multiple input styles including a gesture-based input style and a non-gesture-based input style. The electronic device adapts to the external display device by using the gesture-based input style if the external display device is touch enabled and using the non-gesture-based if the external display is not touch enabled. Additionally or alternatively, the external display device adapts to the input style being used by the electronic device by displaying an augmentation bar associated with the content and supporting the non-gesture-based input style when the external display device detects that the electronic device is using the gesture-based input style.

20 Claims, 10 Drawing Sheets

(56) References Cited

U.S. PATENT DOCUMENTS

| | | | |
|---|---|---|---|
| 2011/0298700 A1* | 12/2011 | Ito | G06F 3/038 |
| | | | 345/156 |
| 2018/0225036 A1 | 8/2018 | Mangeym et al. | |
| 2020/0042274 A1 | 2/2020 | Park et al. | |
| 2022/0093054 A1 | 3/2022 | Agrawal et al. | |

OTHER PUBLICATIONS

"NexDock", NexDock Website [retrieved Sep. 3, 2020]. Retrieved from the Internet: <http://nexdock.com/>, Sep. 3, 2020, 10 pages.
"Notice of Allowability", U.S. Appl. No. 17/026,949, Jun. 30, 2021, 4 pages.
"Notice of Allowance", U.S. Appl. No. 17/026,949, Jun. 14, 2021, 10 pages.
"Vysor", Vysor Website, [retrieved Sep. 9, 2020]. Retrieved from the Internet: <https://www.vysor.io/>, Sep. 9, 2020, 4 pages.
U.S. Appl. No. 17/399,779, "Non-Final Office Action", U.S. Appl. No. 17/399,779, Aug. 24, 2022, 5 pages.
U.S. Appl. No. 17/399,779, "Notice of Allowance", U.S. Appl. No. 17/399,779, Dec. 12, 2022, 5 pages.
Huculak, Mauro , "How to disable touch on a display on Windows 10", Windows Central, [retrieved Sep. 16, 2020]. Retrieved from the Internet: <https://www.windowscentral.com/how-disable-touch-display-windows-10>, Aug. 26, 2019, 14 pages.
Summerson, Cameron , "How to Easily Mirror Your Android Phone's Screen on Your PC with Vysor for Chrome", Computer Guru, [retrieved Sep. 3, 2020]. Retrieved from the Internet: <https://www.howtogeek.com/257023/how-to-easily-mirror-your-android-phones-screen-on-your-pc-with-vysor-for-chrome/>, Jul. 12, 2017, 7 pages.

* cited by examiner

AUTOMATIC INPUT STYLE SELECTION OR AUGMENTATION FOR AN EXTERNAL DISPLAY DEVICE

RELATED APPLICATIONS

This application is a continuation of U.S. patent application Ser. No. 17/399,779, filed Aug. 11, 2021, which is a continuation of U.S. patent application Ser. No. 17/026,949, filed Sep. 21, 2020, to Amit Kumar Agrawal, et al., the disclosures of both of which are hereby incorporated by reference herein in their entirety.

BACKGROUND

As technology has advanced our uses for electronic devices have expanded. One such use is small mobile devices, such as smartphones, which have become increasingly powerful despite their small size. These mobile devices provide a great deal of portable processing power but are not without their problems. One such problem is that the display screens on small devices are themselves small, which can make it difficult for users to interact with various programs on the device. One solution to this problem is to connect the device to a larger external display and the user controls the device by interacting with the larger external display. However, this also has problems because situations arise in which the external display uses a different input style than the device. For example, the device may use touch-based inputs (e.g., a touchscreen) but the external display may not. Trying to interact with the external display that does not support the input style of the device can be frustrating for users, leading to user frustration with their devices.

BRIEF DESCRIPTION OF THE DRAWINGS

Embodiments of automatic input style selection or augmentation for an external display device are described with reference to the following drawings. The same numbers are used throughout the drawings to reference like features and components.

DETAILED DESCRIPTION

Figure 1:
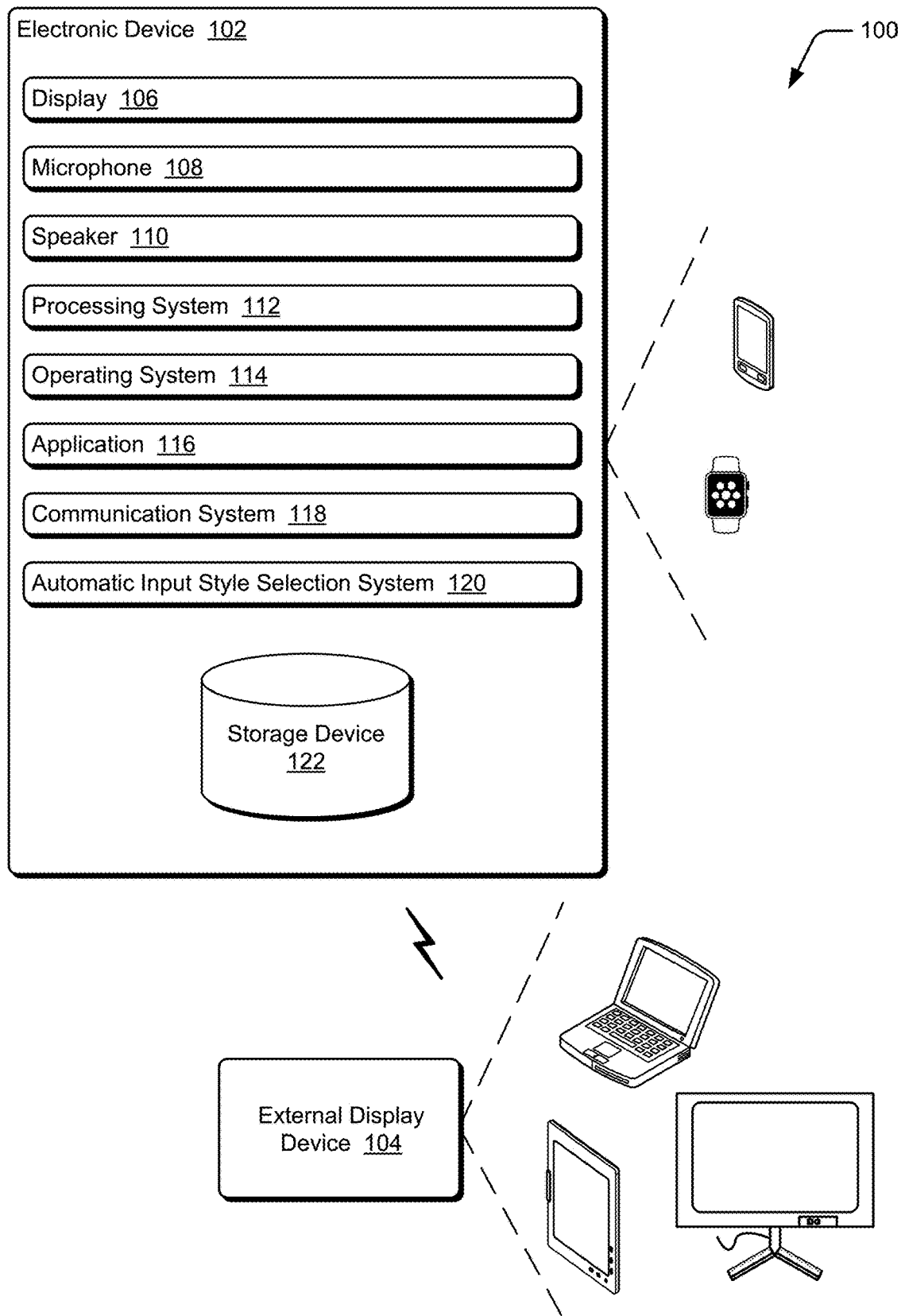
FIG. 1 illustrates an example system implementing the techniques discussed herein.

Automatic input style selection or augmentation for an external display device is discussed herein. Generally, an electronic device (e.g., smartphone) can be connected to at least one external display device. The external display device can be a standalone display device or be part of another electronic device (e.g., a laptop or tablet). Connecting the electronic device to an external display device allows the electronic device to display content on the external display device, such as a user interface allowing navigation to different applications on the electronic device, navigation, or other inputs to an application, and so forth. The manner in which the content is displayed can vary. In one or more implementations, the electronic device operates in a mirror mode, resulting in whatever content is displayed on the electronic device display being displayed on the external display device. Additionally or alternatively, the electronic device operates in a desktop mode where the electronic device generates a different desktop-oriented user interface rather than the user interface displayed on the electronic device display, resulting in the desktop-oriented user interface being displayed on the external display device.

The electronic device supports multiple input styles including a gesture-based input style and a non-gesture-based input style. When the electronic device is connected to the external display device, a check is made as to whether the external display device is touch enabled (e.g., includes a touchscreen). If the external display device is touch enabled then the gesture-based input style is automatically selected as the input style of the electronic device. However, if the external display device is not touch enabled then the non-gesture-based input style is automatically selected as the input style of the electronic device. This allows the user to interact with the external display device to provide user input to the electronic device in a manner the user is accustomed to when interacting with the external display device. For example, this allows the user to interact with a non-touch-enabled external display device by clicking displayed buttons using a mouse rather than attempting to use the mouse to input a gesture, but allows the user to interact with a touch-enabled external display device by inputting gestures on the external display device in the same manner the user is accustomed to when using the electronic device.

Additionally or alternatively, the external display device adapts to the input style being used by the electronic device. If the external display device determines that the electronic device is using (operating in) the gesture-based input style then the external display device automatically displays an augmentation bar associated with the content and supporting the non-gesture-based input style. However, if the external display device determines that the device is using (operating in) the non-gesture-based input style then the external display device need not add the augmentation bar. Thus, the electronic device need not change its input style when connected to the external display device, but the external display device adapts to whatever input style the electronic device is using at any given time when connected to the external display device.

The techniques discussed herein improve the operation of an electronic device by automatically adapting the electronic device to the proper mode based on the characteristics of the external display device. The techniques allow the electronic device to automatically determines the input style that the user would want given the characteristics (e.g., touch enabled or not touch enabled) of the external display device and automatically selects the determined input style when the external display device is connected to the electronic device, and reverting the electronic device to the previously used input style when the external display device is disconnected from the electronic device. The user is alleviated of the burden of selecting the appropriate input style or of knowing the appropriate input style.

Furthermore, in contrast to a solution that augments a user interface displayed on the external display device with a bar or other user interface component that uses a non-gesture-based input style regardless of whether the user interface of the electronic device uses a gesture-based input style, the techniques discussed herein allow the user interface to be automatically augmented only in certain situations (e.g., only when the user interface of the electronic device uses a gesture-based input style).

FIG. 1 illustrates an example system 100 implementing the techniques discussed herein. The system 100 includes an electronic device 102 that can be, or include, many different types of computing or electronic devices. For example, the electronic device 102 can be a smartphone or other wireless phone, a camera (e.g., compact or single-lens reflex), a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth. The electronic device 102 is oftentimes a device having a relatively small display screen making it attractive to connect the electronic device 102 to an external display device 104. Although typically a smaller device, the electronic device 102 can be larger (e.g., a tablet or phablet computer, a notebook computer (e.g., netbook or ultrabook), a laptop computer, and so forth.

The external display device 104 can be configured as any suitable type of display, such as an organic light-emitting diode (OLED) display, active matrix OLED display, liquid crystal display (LCD), in-plane shifting LCD, projector, and so forth. The external display device 104 can be a stand-alone display device capable of displaying content but having little to no other processing power (e.g., lacking processing power and memory to execute applications). Additionally or alternatively, the external display device 104 can be a display device of another computing or electronic device, such as a laptop or tablet device.

The external display device 104 can be touch enabled or not touch enabled. A touch-enabled device refers to a device that receives touch inputs via the display (e.g., a touchscreen). A touch-enabled device may also receive inputs via other input mechanisms, such as trackpad, mouse, physical keyboard, and so forth. A non-touch-enabled device refers to a device that does not receive touch inputs via the display (e.g., a touchscreen). Accordingly, a non-touch-enabled receives inputs via other input mechanisms, such as trackpad, mouse, physical keyboard, and so forth.

The electronic device 102 includes a display 106. The display 106 can be configured as any suitable type of display, such as an OLED display, active matrix OLED display, LCD, in-plane shifting LCD, projector, and so forth. The display 106 can be configured as the same type or a different type as the external display device 104.

The electronic device 102 also includes a microphone 108 and a speaker 110. The microphone 108 can be configured as any suitable type of microphone incorporating a transducer that converts sound into an electrical signal, such as a dynamic microphone, a condenser microphone, a piezoelectric microphone, and so forth. The speaker 110 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the electronic device 102, it should be noted that one or more of the microphone 108 and the speaker 110 can be implemented separately from the electronic device 102. In such situations, the electronic device 102 can communicate with the microphone 108 or the speaker 110 via any of a variety of wired (e.g., Universal Serial Bus (USB), USB-C, IEEE 1394, or wireless (e.g., Wi-Fi, Bluetooth, infrared (IR)) connections. For example, the microphone 108 may be separate from the electronic device 102 and voice inputs received by the microphone 108 are communicated to the electronic device 102 via an IR or radio frequency wireless connection.

The electronic device 102 also includes a processing system 112 that includes one or more processors, each of which can include one or more cores. The processing system 112 is coupled with, and may implement functionalities of, any other components or modules of the electronic device 102 that are described herein. In one or more embodiments, the processing system 112 includes a single processor having a single core. Alternatively, the processing system 112 includes a single processor having multiple cores or multiple processors (each having one or more cores).

The electronic device 102 also includes an operating system 114. The operating system 114 manages hardware, software, and firmware resources in the electronic device 102. The operating system 114 manages one or more applications 116 running on the electronic device 102 and operates as an interface between applications 116 and hardware components of the electronic device 102.

The electronic device 102 also includes a communication system 118. The communication system 118 manages communication with external display device 104 and optionally various other devices. The electronic device 102 can be connected to the external display device 104 and communicate with the external display device 104 using any of a variety of wired or wireless connections, such as USB, USB-C, WiFi™, WiFi™ IP (Internet Protocol), USB IP, DisplayPort, High-Definition Multimedia Interface (HDMI), and so forth. Typically, the electronic device 102 is removably connected to the external display device 104, allowing the external display device 104 to be connected to the external display device 104 and subsequently disconnected from the external display device 104.

The electronic device 102 also includes an automatic input style selection system 120. An input style refers to the manner in which the user navigates through different views, windows, or screens of a device. The automatic input style selection system 120 automatically selects from one of multiple different input styles supported by the electronic device 102 and is made based on the characteristics of the external display device 104 (e.g., whether the external display device 104 is a touch-enabled device or a non-touch-enabled device).

Different input styles are supported by the operating system 114 and applications 116. In one or more embodiments, the electronic device 102 supports a gesture-based input style and a non-gesture-based input style. The gesture-based input style refers to receiving user inputs that are gestures on a touch sensitive device (e.g., a touchscreen display 106, a trackpad), such as a swipe, a touch and hold action, a multi-finger swipe or movement, combinations thereof, and so forth. These gestures can also be referred to as touchscreen gestures or touch gestures. The non-gesture-based input style refers to receiving user inputs that are not gestures and that do not require use of a touch sensitive device, such as user inputs to select one or more buttons (e.g., mouse clicks on a virtual button, pressing a physical button). Although these one or more buttons in a non-gesture-based input style may be virtual buttons displayed on a touchscreen display 106 and may be selected by tapping on the virtual button, the buttons are either activated if touched or not activated if not touched, there is no movement across the touchscreen display 106 (e.g., no swipe) and no touch and hold (the button is either touched or not touched).

The automatic input style selection system 120 can be implemented in a variety of different manners. For example, the automatic input style selection system 120 can be implemented as multiple instructions stored on computer-readable storage media and that can be executed by the processing system 112. Additionally or alternatively, the automatic input style selection system 120 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The electronic device 102 also includes a storage device 122. The storage device 122 can be implemented using any of a variety of storage technologies, such as magnetic disk, optical disc, Flash, or other solid state memory, and so forth. The storage device 122 can store various program instructions and data for any one or more of the operating system 114, application 116, and the automatic input style selection system 120.

Figure 2:
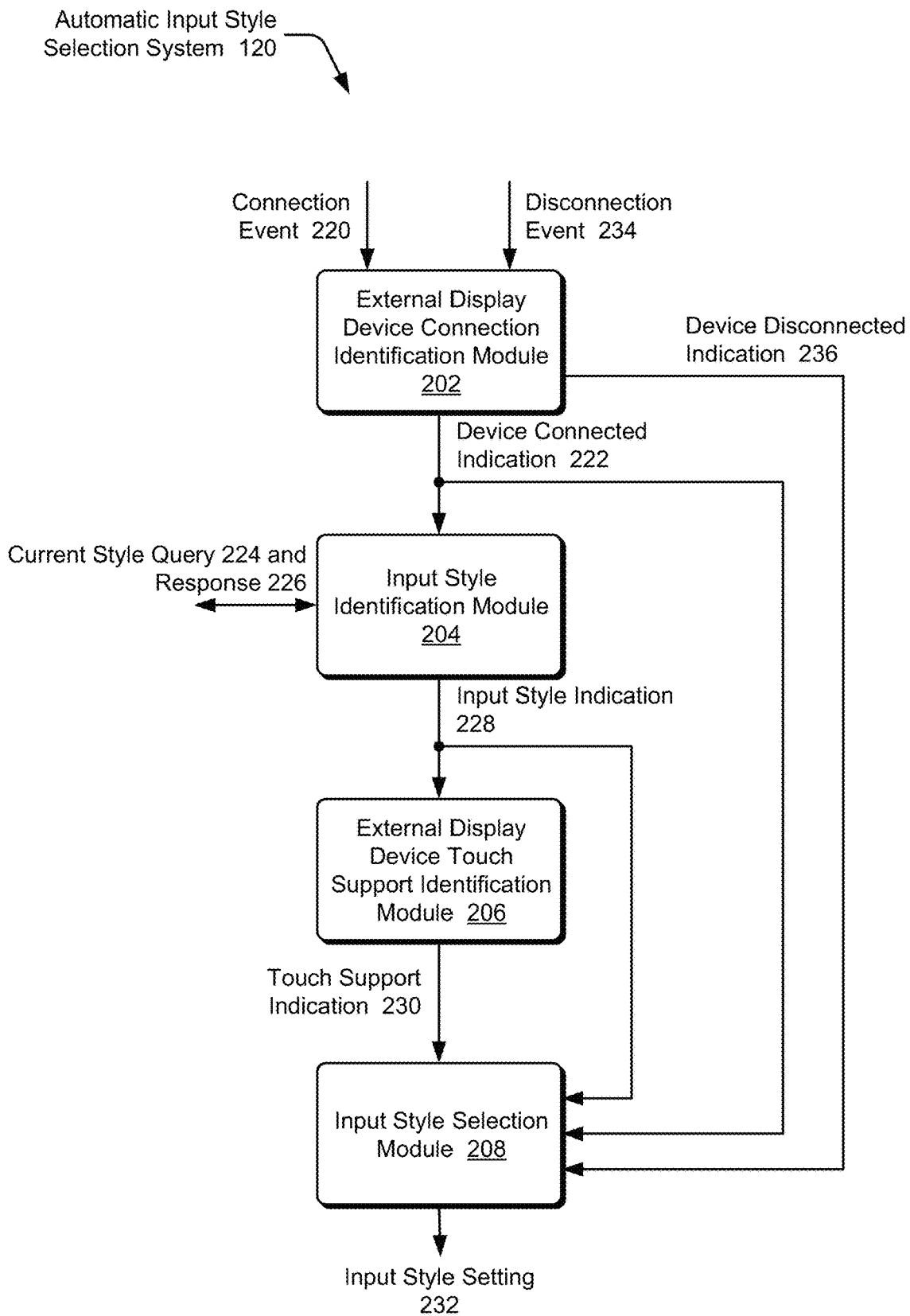
FIG. 2 illustrates an example implementation of the automatic input style selection system.

FIG. 2 illustrates an example implementation of the automatic input style selection system 120. The automatic input style selection system 120 includes an external display device connection identification module 202, an input style identification module 204, an external display device touch support identification module 206, and an input style selection module 208.

The external display device connection identification module 202 implements functionality to detect when the electronic device 102 is connected to the external display device 104. In one or more embodiments, in response to an external display device 104 being connected to the electronic device 102, the operating system 114 or an application 116 on the electronic device 102 communicates an indication of the connection as a connection event 220. The operating system 114 or application 116 can detect that the electronic device 102 has been connected to (or disconnected from) an external display device 104 using any of a variety of public or proprietary techniques. The connection event 220 optionally includes an indication of whether the external display device 104 is touch enabled or not touch enabled. The operating system 114 or application 116 (or the automatic input style selection system 120) can determine whether the external display device 104 is touch enabled or not touch enabled in various manners, such as based on an indication of such received from the external display device 104, based on a type of the connection, based on a model number of the external display device 104, and so forth.

The external display device connection identification module 202 provides a device connected indication 222 to the input style identification module 204 and the input style selection module 208. In response to the device connected indication 222, the input style identification module sends a current style query 224 to the operating system 114 (or alternatively another application 116) requesting the current input style being used by the electronic device 102, and receives a response 226 indicating the current input style being used by the electronic device 102. The input style identification module 204 provides an input style indication 228 to the input style selection module 208 and optionally to the external display device touch support identification module 206.

In one or more embodiments, the external display device touch support identification module 206 determines whether the external display device 104 is touch enabled or not touch enabled and can do so in various manners, such as based on an indication of such received from the external display device 104, based on a type of the connection, based on a model number of the external display device 104, and so forth. The external display device touch support identification module 206 can obtain information regarding the external display device 104 in various manners, such as from the operating system 114 or an application 116, from the external display device connection identification module 202 (e.g., information included in the connection event 220), and so forth. The external display device touch support identification module 206 provides an indication of whether the external display device 104 is touch enabled or not touch enabled to the input style selection module 208 as touch support indication 230. Additionally or alternatively, if the connection event 220 includes an indication of whether the external display device 104 is touch enabled or not touch enabled then the automatic input style selection system 120 need not include the external display device touch support identification module 206.

In one or more embodiments, the external display device 204 supports being both touch enabled and not touch enabled. E.g., the external display device 204 may include a user-selectable setting allowing the user to switch between the external display device 204 operating as a touch-enabled device and operating as a non-touch-enabled device (e.g., enabling or disabling touch input). In such situations, the external display device touch support identification module 206 can determine whether the external display device 204 is operating as a touch-enabled device or a non-touch-enabled device in any of a variety of different manners. For example, electronic device 102 may receive an indication from the external display device 204, which is provided to the external display device touch support identification module 206, indicating whether the external display device 204 is currently operating as a touch-enabled device or a non-touch-enabled device. In response to the external display device 204 changing from operating to a touch-enabled to a non-touch-enabled, or vice versa, the external display device 204 provides an indication of the change to the electronic device 102, which is provided to the external display device touch support identification module 206.

The input style selection module 208 receives the device connected indication 222 and optionally the touch support indication 230. In response to the device connected indication 222, the input style selection module 208 determines an input style setting 232 for the electronic device 102. If the external display device 104 is touch enabled then the input style selection module 208 selects a gesture-based input style as the current input style. However, if the external display device 104 is not touch enabled then the input style selection module 208 selects a non-gesture-based style as the current input style. This input style setting 232 is also referred to as the current input style. The input style setting 232 is provided to the operating system 114 or an application 116, allowing the appropriate one of a gesture-based style or a non-gesture-based style to be the current input style.

In one or more embodiments, the input style selection module 208 outputs the input style setting 232 only if the current input style as determined by the input style selection module 208 is different than the style indicated by the input style indication 228, resulting in the current input style being changed to the input style determined by the input style selection module 208. Additionally or alternatively, the input style selection module 208 can provide the input style setting regardless of the input style indication 228.

The input style selection module 208 also maintains a record of the current input style as determined by the input style selection module 208. Similar to the discussion above regarding the connection event 220, in response to an external display device 104 being disconnected from the electronic device 102, the operating system 114 or an application 112 on the electronic device 102 communicates an indication of the disconnection as a disconnection event 234. The external display device connection identification module 202 provides a device disconnected indication 236 to the input style selection module 208. In response to the device disconnected indication 236, the input style selection module 208 outputs, as the input style setting 232 provided to the operating system 114 or an application 116, indicating that the previous input style (as indicated by the record maintained by the input style selection module 208) is to be the current input style. This effectively reverts the current input style to be the same as it was when the connection event 220 was received.

In one or more embodiments, the input style selection module 208 outputs the input style setting 232 only if the current input style as determined by the input style selection module 208 is different than the style indicated by the input style indication 228, resulting in the current input style being changed to the input style determined by the input style selection module 208. Additionally or alternatively, the input style selection module 208 can provide the input style setting regardless of the input style indication 228.

Figure 3:
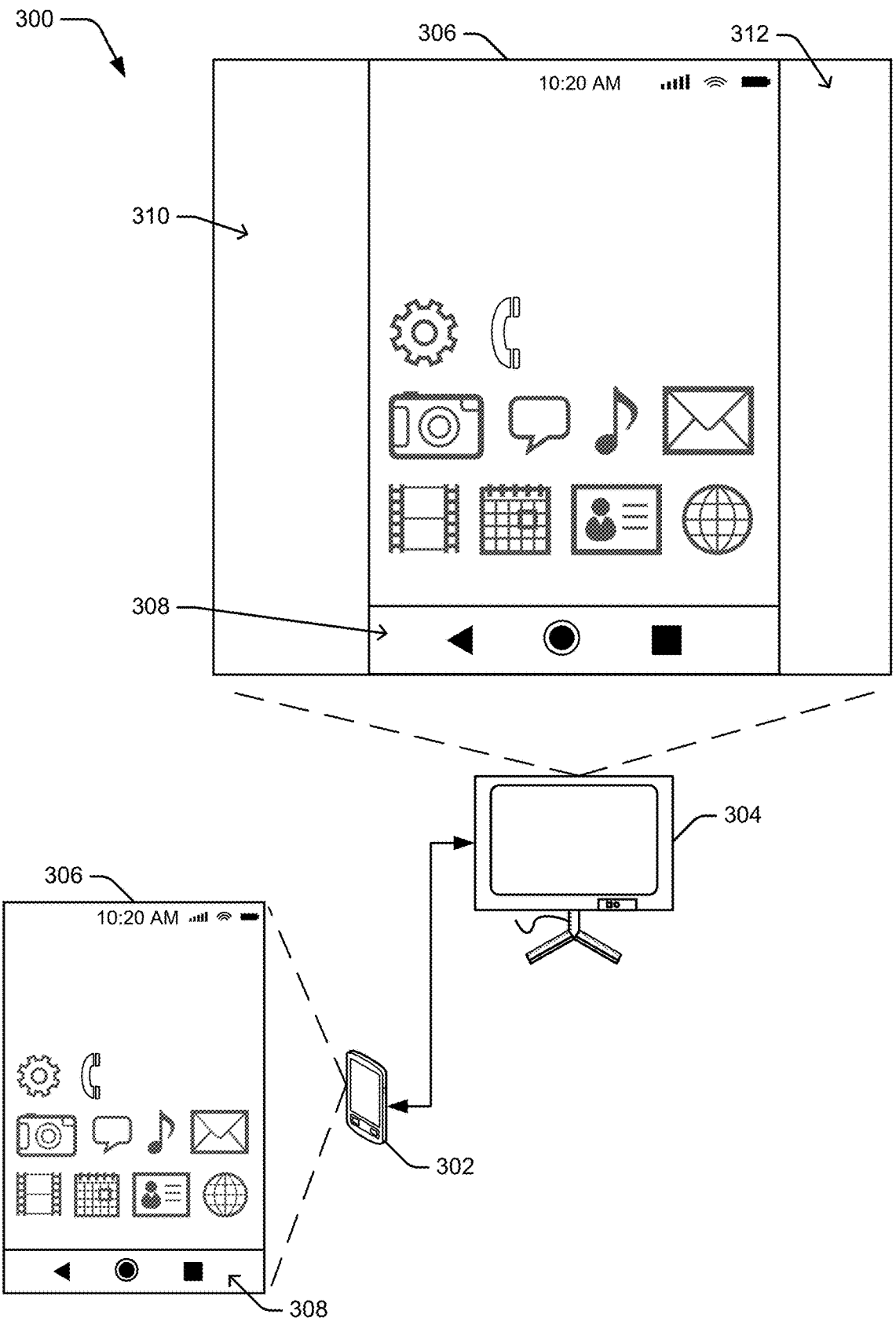
FIGS. 3, 4, and 5 illustrate examples of using the techniques discussed herein.

FIG. 3 illustrates an example 300 of using the techniques discussed herein. The example 300 includes an electronic device 302 (e.g., an electronic device 102 of FIG. 1) and an external display device 304 (e.g., an external display device 104 of FIG. 1). The electronic device 302 displays on its display a user interface 306 including multiple icons that can be selected to perform various operations or run various applications, (e.g., a phone icon selectable to launch a phone application, a music not selectable to launch a music playback application).

The electronic device 302 is operating in the non-gesture-based input style, which the electronic device 302 automatically selected in response to being connected to the external display device 304 and determining that the external display device 304 is not touch enabled. Accordingly, the user interface 306 also includes a button bar 308 with various buttons that can be selected to perform various operations. In the illustrated example, the button bar 308 includes a triangle button (e.g., selectable to navigate back one step or screen), a circle button (e.g., selectable to navigate to a home screen or desktop view), and a square button (e.g., selectable to show all currently running applications).

The electronic device 302 is also operating in a mirror mode, resulting in whatever content is displayed on the electronic device display being displayed on the external display device. Thus, the user interface 306 including the button bar 308 is displayed on the external display device 304. In the illustrated example the external display device 304 has different display dimensions, resulting in blank portions 310 and 312 on either side of the user interface 306 that are, for example, a solid color.

Figure 4:
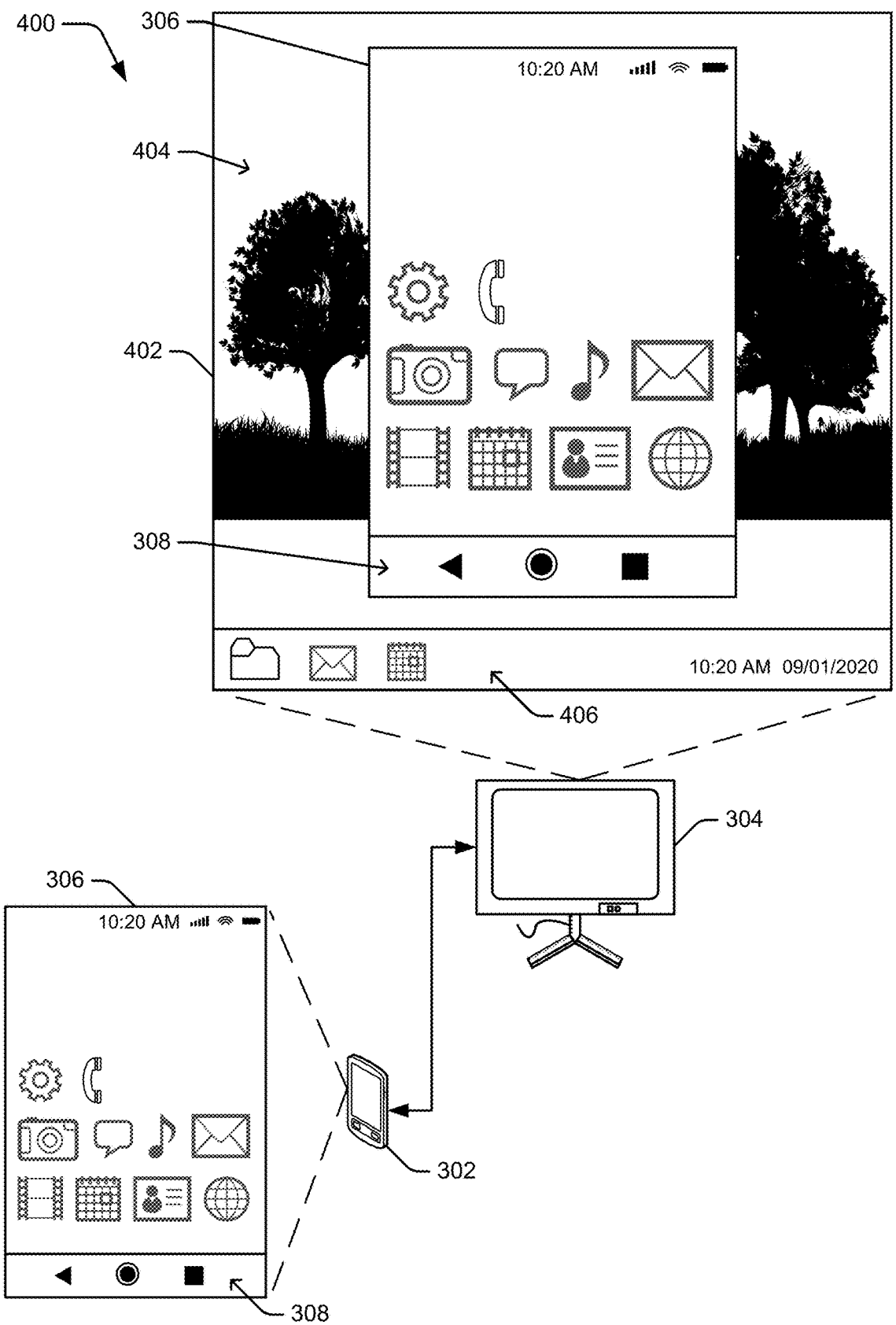

FIG. 4 illustrates another example 400 of using the techniques discussed herein. Example 400 is similar to example 300 and includes the electronic device 302 displaying the user interface 306 including the button bar 308, and the external display device 304 displaying the user interface 306 including the button bar 308. The electronic device 302 is operating in the non-gesture-based input style, which the electronic device 302 automatically selected in response to being connected to the external display device 304 and determining that the external display device 304 is not touch enabled.

Example 400 differs from example 300 in that the electronic device 302 is operating in a mobile desktop mode rather than a mirror mode. In the mobile desktop mode, a desktop user interface 402 is displayed on the external display device and the user interface 306 is displayed (e.g., as a window) on the desktop user interface 402. Accordingly, the external display device 304 also displays a desktop background 404 and a desktop toolbar 406. Similar to the example 300, the external display device 304 has different display dimensions, resulting in a portion of the background 404 being displayed around the user interface 306.

Figure 5:
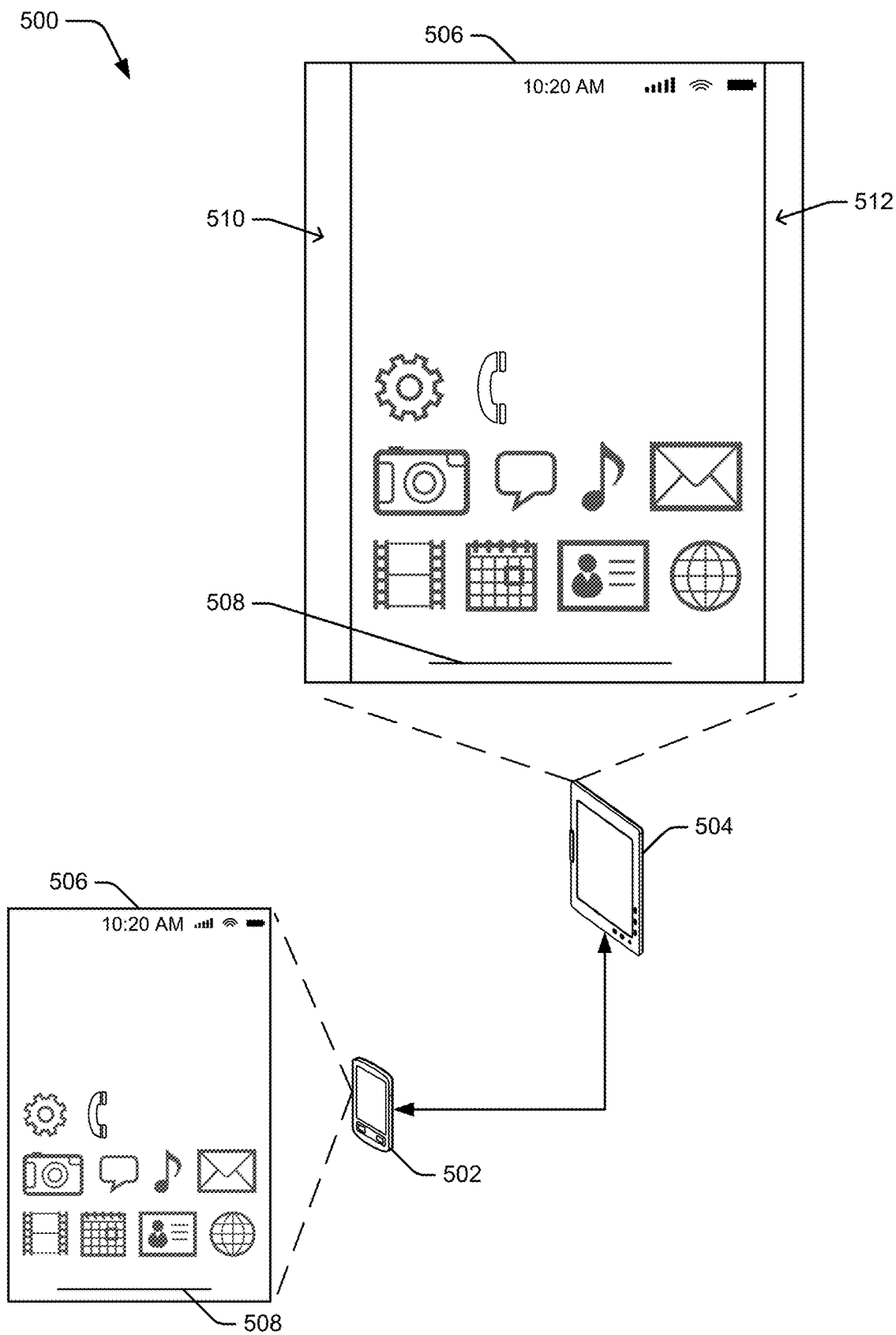

FIG. 5 illustrates another example 500 of using the techniques discussed herein. The example 500 includes an electronic device 502 (e.g., an electronic device 102 of FIG. 1) and an external display device 504 (e.g., an external display device 104 of FIG. 1). The electronic device 502 displays on its display a user interface 506 including multiple icons that can be selected to perform various operations or run various applications, (e.g., a phone icon selectable to launch a phone application, a music not selectable to launch a music playback application).

The electronic device 502 is operating in the gesture-based input style, which the electronic device 502 automatically selected in response to being connected to the external display device 504 and determining that the external display 504 is touch enabled. Accordingly, the user interface 506 also includes a swipe bar 508 that indicates to the user that the electronic device 502 is operating in the gesture-based input style. Additionally or alternatively, the swipe bar 508 need not be displayed. Examples of gestures the user can input in the gesture-based input style include swiping from up from the bottom of the electronic device 502 display to navigate to a home screen or desktop view, swiping across the bottom of the electronic device 502 to switch applications, swiping from either side of the electronic device 502 to navigate back one step or screen, and so forth.

The electronic device 502 is also operating in a mirror mode, resulting in whatever content is displayed on the electronic device display being displayed on the external display device. Thus, the user interface 506 including the swipe bar 508 is displayed on the external display device 504. In the illustrated example the external display device 504 has different display dimensions, resulting in blank portions 510 and 512 on either side of the user interface 506 that are, for example, a solid color.

Figure 6:
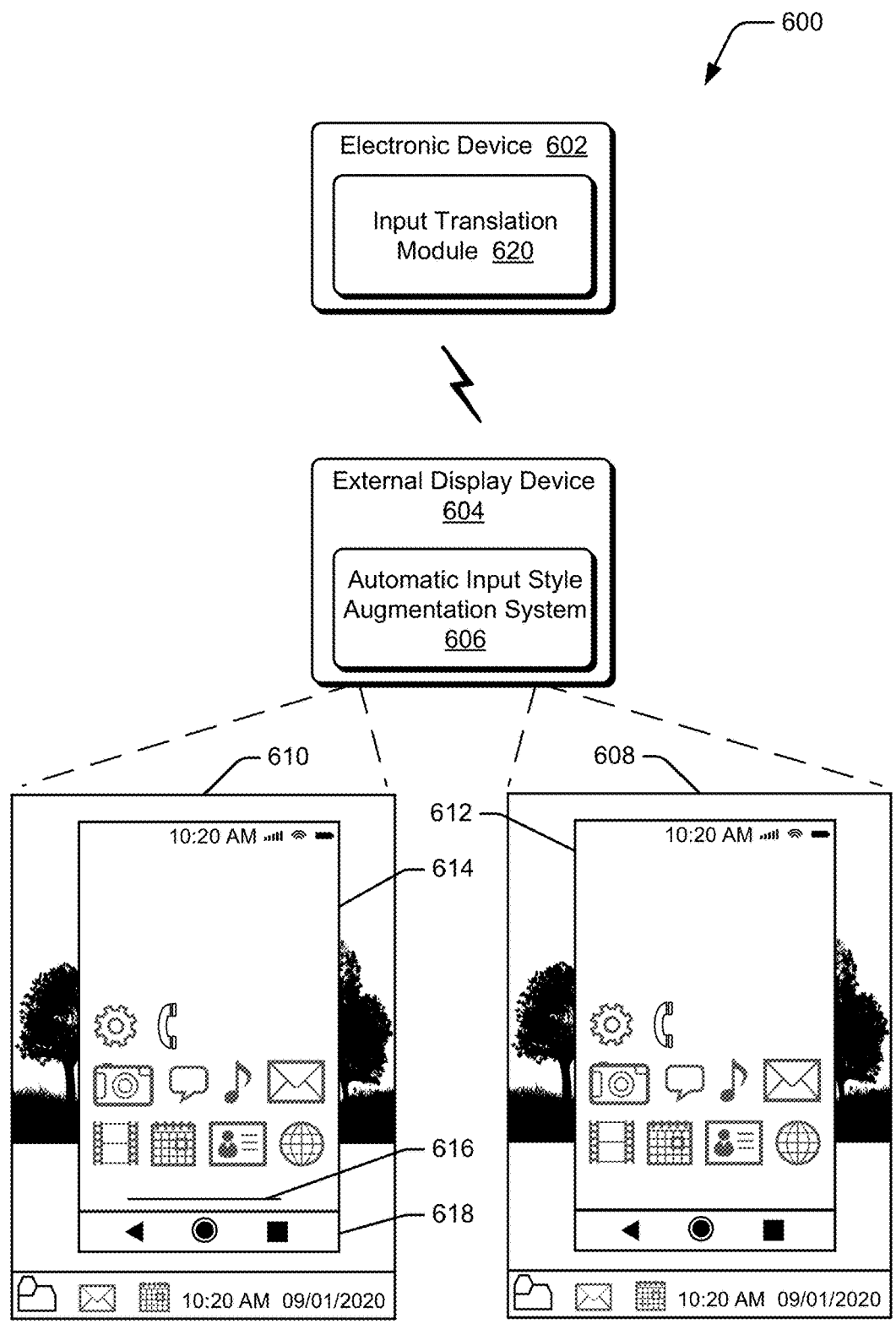
FIG. 6 illustrates another example system implementing the techniques discussed herein.

FIG. 6 illustrates another example system 600 implementing the techniques discussed herein. The system 600 includes an electronic device 602 and an external display device 604. The electronic device 602 can be an electronic device 102 of FIG. 1, although in one or more embodiments the electronic device 602 need not include an automatic input style selection system 120. The external display device 604 includes an automatic input style augmentation system 606 that implements functionality to augment content received from the electronic device 602 to include an augmentation bar supporting the non-gesture-based input style or the gesture-based input style.

In response to being connected to the electronic device 602, the automatic input style selection system 606 determines whether the electronic device 602 is using a gesture-based input style or non-gesture-based input style, and displays an augmentation bar if the electronic device is using a gesture-based input style. This allows, for example, the user to interact with the augmentation bar using the non-gesture-based input style (e.g., a mouse and pointer) even though the external display device 604 may be touch enabled. This also allows the electronic device 602 to avoid changing the input style it is using based on whether the external display device 604 is touch enabled or not touch enabled. The external display device 604 can detect when it is connected to an electronic device 602 using any of a variety of public or proprietary techniques.

As illustrated in FIG. 6, when connected to the electronic device 602 at any given time the external display device 604 displays one of two different user interfaces, user interface 608 or user interface 610, for the electronic device 602 operating in a mobile desktop mode. Additionally or alternatively, the electronic device 602 may be operating in the mirror mode. User interface 608 includes user interface 612, received from the electronic device 602, using the non-gesture-based input style. As the user interface 612 is already using the non-gesture-based input style, the automatic input style selection system 606 need not display an augmentation bar. However, user interface 610 includes user interface 614, received from the electronic device 602, using the gesture-based input style (e.g., as indicated by the swipe bar 616 in the user interface 614). As the user interface 614 is using a gesture-based input style, the automatic input style selection system 606 displays an augmentation bar 618 adjacent to (e.g., immediately below) the user interface 614. The augmentation bar 618 is analogous to the button bar 308 discussed above, except that the augmentation bar 618 is provided by the automatic input style selection system 606 rather than the electronic device 602. This allows the user to interact with the augmentation bar 618 using the non-gesture-based input style rather than with the user interface 614 using the gesture-based input style. Although the augmentation bar 618 is illustrated as being adjacent to the user interface 614, the augmentation bar 618 can alternatively be displayed elsewhere on the user interface 610.

In one or more embodiments, user input to the augmentation bar 618 is identified by the automatic input style selection system 606 and communicated to the electronic device 602. The electronic device 602 includes an input translation module 620 that translates the user input to the augmentation bar 618 into a corresponding gesture-based input to the user interface 614. For example, if the user input to the augmentation bar 618 is selection of the circle button, the input translation module 620 translates the user input into a swipe up from the bottom of the display, indicating to navigate to a home screen or desktop view. The input translation module 620 provides the translated user input to the appropriate application or operating system program to perform the user selected action.

The automatic input style selection system 606 can determine whether the electronic device 602 is using a gesture-based input style or non-gesture-based input style in any of a variety of different manners. In one or more embodiments, the electronic device 602 provides an indication to the external display device 604 of the current input style, such as by communicating the input style setting 232 to the automatic input style selection system 606. Additionally or alternatively, the automatic input style selection system 606 automatically detects the input style being used by the electronic device 602, such as by analyzing the content received from the electronic device 602 to determine whether that content includes the buttons of a non-gesture-based input style (e.g., button bar 308), and determining that the electronic device 602 is using the non-gesture-based input style if the content includes the buttons and is using the gesture-based input style if the content does not include the buttons. By way of another example, the automatic input style selection system 606 analyzes the content received from the electronic device 602 to determine whether that content includes an indication of a gesture-based input style (e.g., swipe bar 616), and determining that the electronic device 602 is using the gesture-based input style if the content includes the indication and is using the non-gesture-based input style if the content does not include the indication.

Additionally or alternatively, in response to being connected to the electronic device 602, the automatic input style selection system 606 displays an augmentation bar if the electronic device 602 is using a non-gesture-based input style, although this augmentation bar would display an indication that the gesture-based input style is used at the external display device 604 (e.g., displays a swipe bar analogous to swipe bar 508 of FIG. 5). This allows, for example, the user to interact with the augmentation bar using the gesture-based input style (gestures on the external display device 604) even though the electronic device 602 is using the non-gesture-based input style 604. This also allows the electronic device 602 to avoid changing the input style it is using based on whether the external display device 604 is touch enabled or not touch enabled. Accordingly, a user can use gestures to interact with the electronic device 602 user interface displayed on a touch-enabled external display device 604 even though the electronic device 602 is using the non-gesture-based input style.

In such situations, user input to the external display device 604 (e.g., a gesture) is identified by the automatic input style selection system 606 and communicated to the electronic device 602. The input translation module 620 translates the gesture user input into a corresponding non-gesture-based input to the user interface 614. For example, if the user input to the augmentation bar 618 is a swipe up from the bottom of the display, the input translation module 620 translates the user input into selection of the circle button, indicating to navigate to a home screen or desktop view. The input translation module 620 provides the translated user input to the appropriate application or operating system program to perform the user selected action.

Additionally or alternatively, the automatic input style selection system 606 determines whether the external display device 604 is currently touch enabled. E.g., external display device 604 may be a touch-enabled display device but be operating in a non-touch-enabled mode (e.g., touch input may be disabled on the external display device 604), external display device 604 may not be touch enabled, and so forth. If the automatic input style selection system 606 determines that the electronic device 602 is using (operating in) the gesture-based input style then the external display device automatically displays an augmentation bar associated with the content and supporting the non-gesture-based input style, optionally dependent on whether the external display device 604 is currently touch enabled. If the electronic device 602 is using a gesture-based input style and the external display device 604 is touch enabled, then the external display device 604 does not display an augmentation bar. However, if the electronic device 602 is using a gesture-based input style and the external display device 604 is not touch enabled, then the external display device 604 automatically displays an augmentation bar associated with the content and supporting the non-gesture-based input style.

However, if the automatic input style selection system 606 determines that the electronic device 602 is using (operating in) the non-gesture-based input style then then the external display device 604 does not display an augmentation bar, optionally dependent on whether the external display device 604 is currently touch enabled. If the electronic device 602 is using a non-gesture-based input style and the external display device 604 is not touch enabled, then the external display device 604 does not display an augmentation bar. However, if the electronic device 602 is using a non-gesture-based input style and the external display device 604 is touch enabled, then the external display device 604 automatically displays an augmentation bar associated with the content and supporting the non-gesture-based input style.

Figure 7:
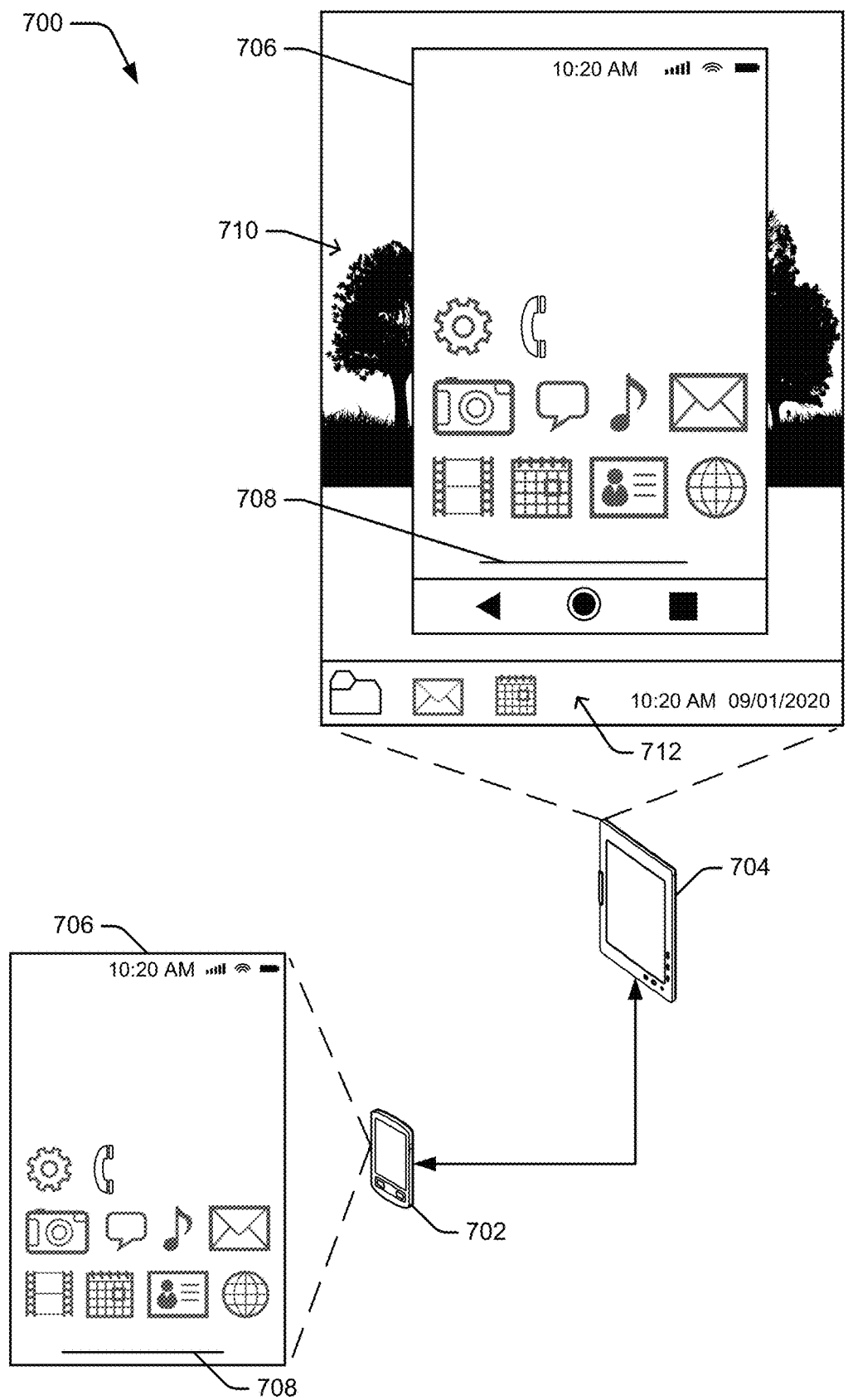
FIG. 7 illustrates another example of using the techniques discussed herein.

FIG. 7 illustrates another example 700 of using the techniques discussed herein. The example 700 includes an electronic device 702 (e.g., an electronic device 602 of FIG. 6) and an external display device 704 (e.g., an external display device 604 of FIG. 6). The electronic device 702 displays on its display a user interface 706 including multiple icons that can be selected to perform various operations or run various applications, (e.g., a phone icon selectable to launch a phone application, a music not selectable to launch a music playback application).

The electronic device 702 is operating in the gesture-based input style. Accordingly, the user interface 706 also includes a swipe bar 708 that indicates to the user that the electronic device 702 is operating in the gesture-based input style. Additionally or alternatively, the swipe bar 708 need not be displayed.

The electronic device 702 is also operating in a mobile desktop mode, resulting in whatever content is displayed on the electronic device display being displayed on the external display device (e.g., in a window on the desktop). Thus, the user interface 706 including the swipe bar 708 is displayed on the external display device 704 along with a desktop background 710 and a desktop toolbar 712. In the illustrated example the external display device 704 has different display dimensions, resulting in a portion of the background 710 being displayed around the user interface 706.

It should be noted that references are made herein to user inputs for a navigation system (e.g., navigating to a home screen, navigating to a different application). Additionally or alternatively, the user inputs in the gesture-based input style or the non-gesture-based input style can be inputs to any of a variety of other types of applications or programs, such as productivity applications (e.g., word processing applications, dictation applications), recreational applications (e.g., games), and so forth.

Figure 8:
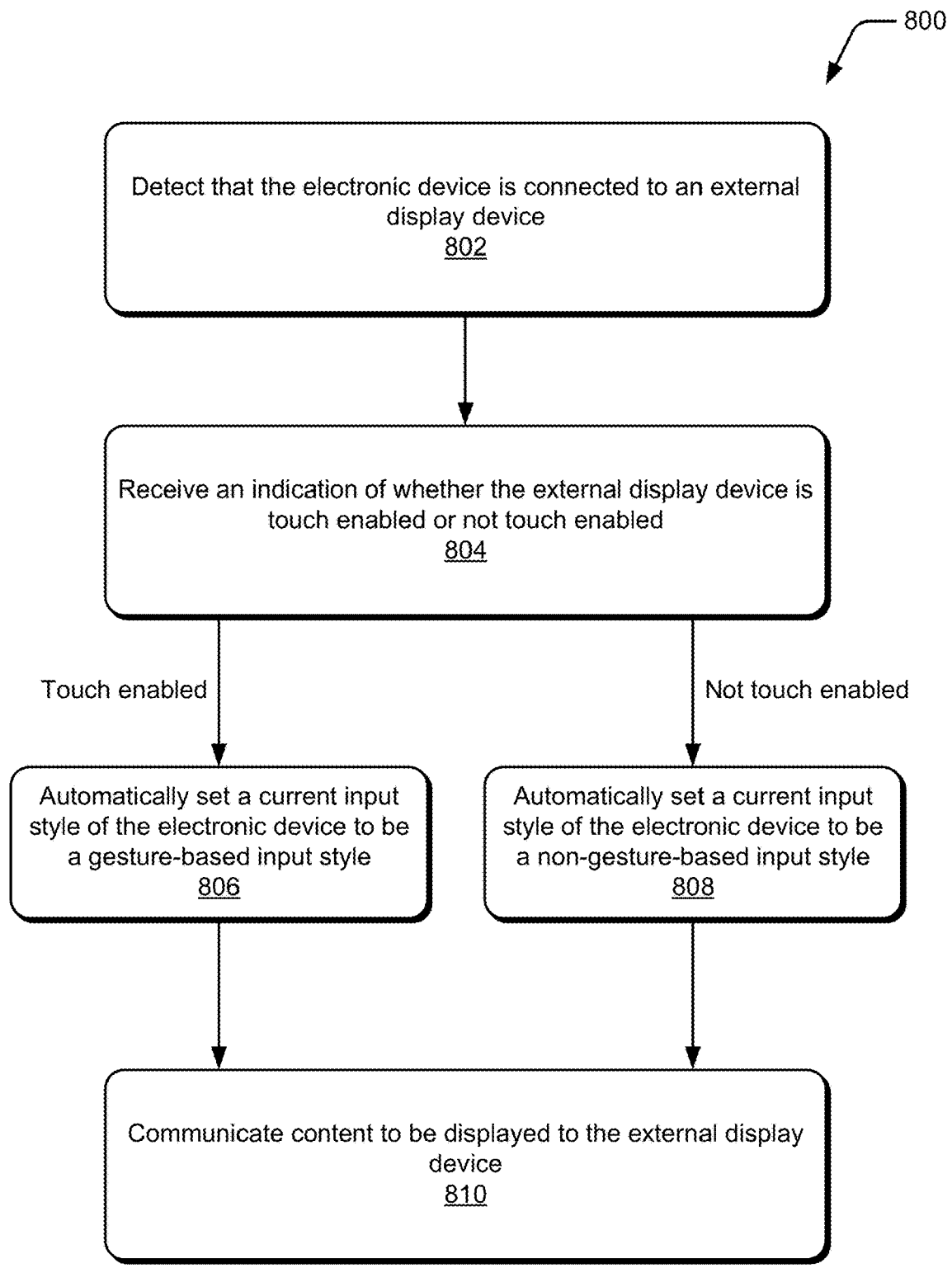
FIGS. 8 and 9 illustrate an example process for implementing the techniques discussed herein in accordance with one or more embodiments.

FIG. 8 illustrates an example process 800 for implementing the techniques discussed herein in accordance with one or more embodiments. Process 800 is carried out by an automatic input style selection system, such as automatic input style selection system 120 of FIG. 1 or FIG. 2, and can be implemented in software, firmware, hardware, or combinations thereof. Process 800 is shown as a set of acts and is not limited to the order shown for performing the operations of the various acts.

In process 800, the electronic device being connected to an external display device is detected (act 802). As discussed above, this connection can be a wireless connection or a wired connection.

An indication of whether the external display device is touch enabled or not touch enabled is received (act 804). This indication can be received, for example, from the external display device.

Process 800 proceeds based on whether the external display device is touch enabled or is not touch enabled. If the external display device is touch enabled then the current input style of the electronic device is automatically set to be a gesture-based input style (act 806). However, if the external display device is not touch enabled then the current input style of the electronic device is automatically set to be a non-gesture-based input style (act 808).

Content is communicated to the external display device for display (act 810). This content includes buttons or other user interface elements associated with the current input style of the electronic device, such as a button bar or a swipe bar.

Figure 9:
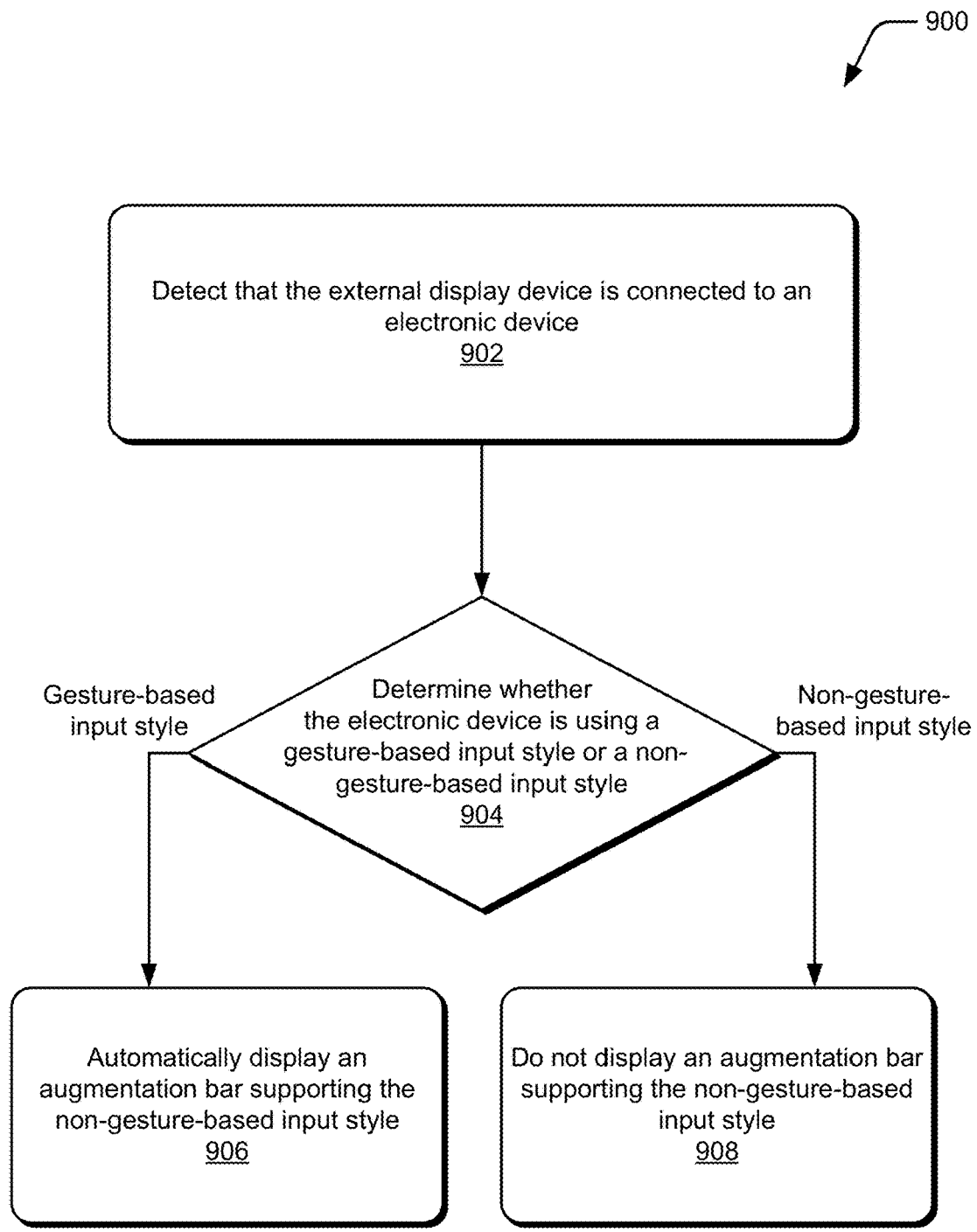

FIG. 9 illustrates another example process 900 for implementing the techniques discussed herein in accordance with one or more embodiments. Process 900 is carried out by an automatic input style selection system, such as automatic input style selection system 606 FIG. 6, and can be implemented in software, firmware, hardware, or combinations thereof. Process 900 is shown as a set of acts and is not limited to the order shown for performing the operations of the various acts.

In process 900, the external display device being connected to an electronic device is detected (act 902). As discussed above, this connection can be a wireless connection or a wired connection, and can be detected using any of a variety of public or proprietary techniques.

A determination is made as to whether the electronic device is using a gesture-based input style or a non-gesture-based input style (act 904). This determination can be made in various manners as discussed above, such as based on a current input style indication received from the electronic device, by analyzing content received from the electronic device for display by the external display device, and so forth.

In response to determining that the electronic device is using a gesture-based input style, an augmentation bar supporting the non-gesture-based input style is automatically displayed (act 906). This allows user inputs to be received in the non-gesture-based input style even though the electronic device is displaying a gesture-based input style and even if the external display device is touch enabled.

However, in response to determining that the electronic device is using a non-gesture-based input style, an augmentation bar supporting the non-gesture-based input style is not displayed (act 908). The content (user interface) provided by the electronic device is already using a non-gesture-based input style so additional support for a non-gesture-based input style need not be displayed.

Figure 10:
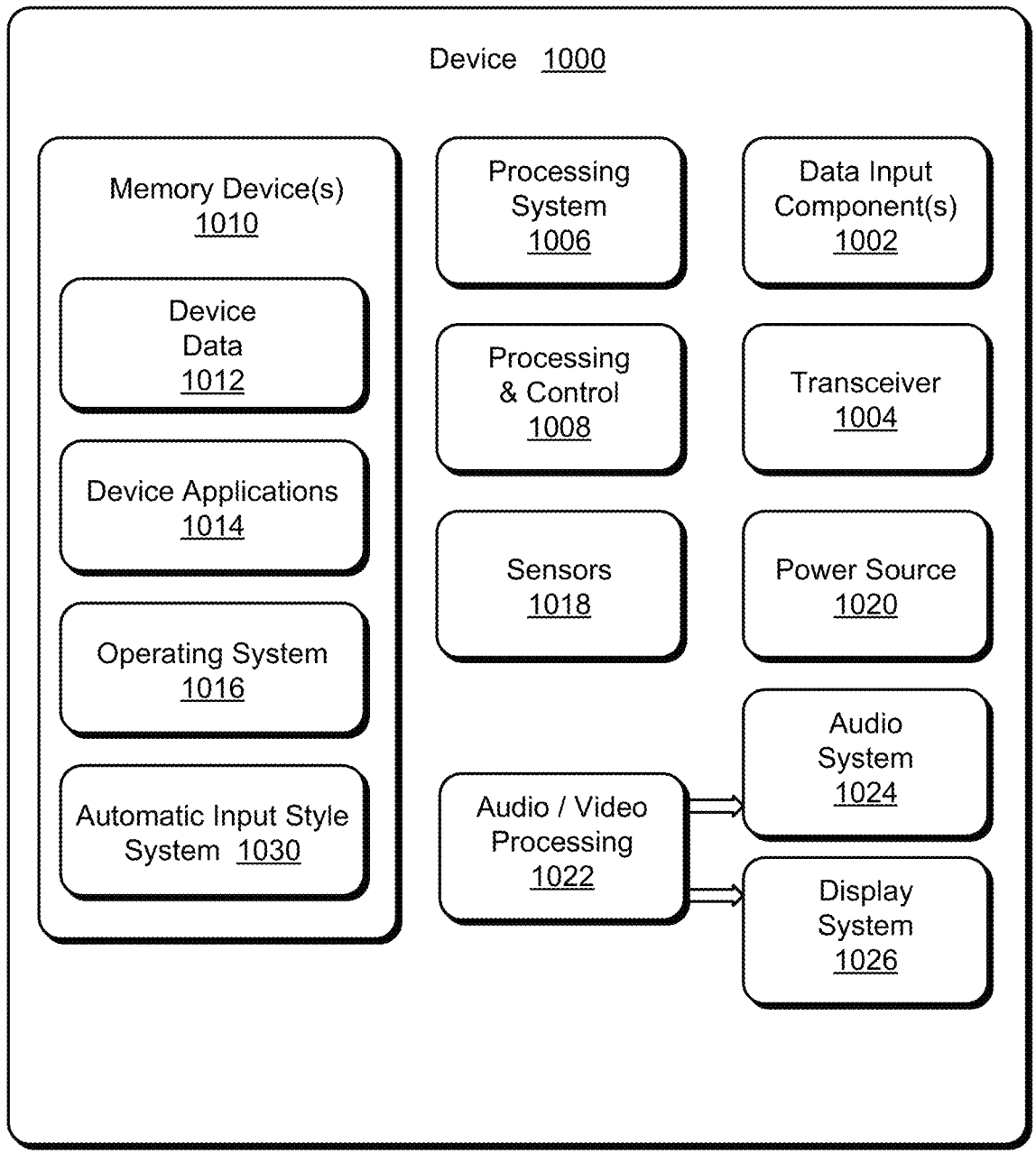
FIG. 10 illustrates various components of an example electronic device that can implement embodiments of the techniques discussed herein.

FIG. 10 illustrates various components of an example electronic device in which embodiments of automatic input style selection or augmentation for an external display device can be implemented. The electronic device 1000 can be implemented as any of the devices described with reference to the previous FIG.s, such as any type of client device, mobile phone, tablet, computing, communication, entertainment, gaming, media playback, or other type of electronic device. In one or more embodiments the electronic device 1000 is an electronic device 102 and the automatic input style system 1030 includes the automatic input style selection system 120, described above. Additionally or alternatively, the electronic device 1000 is an external display device 604 and the automatic input style system 1030 includes an automatic input style selection system 606, described above.

The electronic device 1000 includes one or more data input components 1002 via which any type of data, media content, or inputs can be received such as user-selectable inputs, messages, music, television content, recorded video content, and any other type of text, audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, touchscreens, keyboards, and so forth.

The device 1000 includes communication transceivers 1004 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1000 includes a processing system 1006 of one or more processors (e.g., any of microprocessors, controllers, and the like) or a processor and memory system implemented as a system-on-chip (SoC) that processes computer-executable instructions. The processing system 1006 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1008. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1010 that enable data storage, such as data storage devices that can be accessed by an electronic device, and that provide persistent storage of data and executable instructions (e.g., software applications, programs, functions, and the like). Examples of the computer-readable storage memory devices 1010 include volatile memory and non-volatile memory, fixed and removable media devices, and any suitable memory device or electronic data storage that maintains data for electronic device access. The computer-readable storage memory can include various implementations of random access memory (RAM), read-only memory (ROM), flash memory, and other types of storage media in various memory device configurations. The device 1000 may also include a mass storage media device.

The computer-readable storage memory device 1010 provides data storage mechanisms to store the device data 1012, other types of information or data, and various device applications 1014 (e.g., software applications). For example, an operating system 1016 can be maintained as software instructions with a memory device and executed by the processing system 1006. The device applications 1014 may also include a device manager, such as any form of a control application, software application, signal-processing and control module, code that is native to a particular device, a hardware abstraction layer for a particular device, and so on.

The device 1000 can also include one or more device sensors 1018, such as any one or more of an ambient light sensor, a proximity sensor, a touch sensor, an infrared (IR) sensor, accelerometer, gyroscope, thermal sensor, audio sensor (e.g., microphone), and the like. The device 1000 can also include one or more power sources 1020, such as when the device 1000 is implemented as a mobile device. The power sources 1020 may include a charging or power system, and can be implemented as a flexible strip battery, a rechargeable battery, a charged super-capacitor, or any other type of active or passive power source.

The device 1000 additionally includes an audio or video processing system 1022 that generates one or both of audio data for an audio system 1024 and display data for a display system 1026. In accordance with some embodiments, the audio/video processing system 1022 is configured to receive call audio data from the transceiver 1004 and communicate the call audio data to the audio system 1024 for playback at the device 1000. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for automatic input style selection or augmentation for an external display device have been described in language specific to features or methods, the subject of the appended claims is not necessarily limited to the specific features or methods described. Rather, the specific features and methods are disclosed as example implementations of techniques for implementing automatic input style selection or augmentation for an external display device. Further, various different embodiments are described, and it is to be appreciated that each described embodiment can be implemented independently or in connection with one or more other described embodiments. Additional aspects of the techniques, features, and/or methods discussed herein relate to one or more of the following:

A method, implemented in an electronic device, the method comprising: detecting that the electronic device is connected to an external display device to display content on the external display device; receiving an indication of whether the external display device is touch enabled or not touch enabled; automatically setting, in response to determining that the external display device is not touch enabled, a current input style of the electronic device to be a non-gesture-based input style; and communicating content to be displayed, while the current input style of the electronic device is the non-gesture-based input style, to the external display device.

Alternatively or in addition to the above described method, any one or combination of the following. The method further comprising automatically changing, in response to determining that the external display device is touch enabled, the current input style to be the gesture-based input style. Wherein the external display device supports being both touch enabled and not touch enabled, and determining that the external display device is touch enabled in response to an indication from the external display device that touch input to the external display device has not been disabled. The method further comprising: maintaining an indication of a previous input style of the electronic device, the previous input style being a input style of the electronic device prior to automatically setting the current input style of the electronic device to the non-gesture-based input style; detecting that the electronic device is disconnected from the external display device; and automatically setting, in response to detecting that the electronic device is disconnected from the external display device, the current input style of the electronic device to be the previous input style. Wherein the external display device comprises an external monitor. Wherein the external display device comprises a display device of a laptop or a tablet device. The method further comprising: determining that the external display device is operating in a mirror mode to display content that is screen display of the electronic device; and automatically setting, in response to determining that the external display device is not touch enabled and the external display device is operating in the mirror mode, the current input style of the electronic device to be the non-gesture-based input style. The gesture-based input style being based on gestures including one or a combination of swipe, touch and hold, and the non-gesture-based input style being based on a tap on one or more buttons.

An electronic device comprising: a processor implemented in hardware; and a computer-readable storage medium having stored thereon multiple instructions that, responsive to execution by the processor, cause the processor to perform acts including: detecting that the electronic device is connected to a external display device to display content on the external display device; receiving, from the external display device, an indication of whether the external display device is touch enabled or not touch enabled; automatically setting, in response to determining that the external display device is not touch enabled, the current input style of the electronic device to be the non-gesture-based input style; and communicating content to be displayed, while the current input style of the electronic device is the non-gesture-based input style, to the external display device.

Alternatively or in addition to the above described electronic device, any one or combination of the following. The acts further comprising automatically setting, in response to determining that the external display device is touch enabled and that the current input style is the non-gesture-based input style, the current input style to be the gesture-based input style. The acts further comprising: maintaining an indication of a previous input style of the electronic device, the previous input style being an input style of the electronic device prior to automatically changing the current input style of the electronic device to the non-gesture-based input style; detecting that the electronic device is disconnected from the external display device; and automatically setting, in response to detecting that the electronic device is disconnected from the external display device, the current input style of the electronic device to be the previous input style. Wherein the external display device comprises an external monitor. Wherein the external display device comprises a display device of a laptop or a tablet device. The acts further comprising: determining whether a current input style of the electronic device is a gesture-based input style or a non-gesture-based input style; and the automatically setting comprising automatically changing, in response to determining that the external display device is not touch enabled and that the current input style is the gesture-based input style, the current input style of the electronic device to be the non-gesture-based input style. The acts further comprising: determining that the external display device is operating in a mirror mode to display content that is screen display of the electronic device; and the automatically setting comprising automatically changing the current input style of the electronic device to be the non-gesture-based input style in response to determining that the external display device is not touch enabled, that the current input style is the gesture-based input style, and that the external display device is operating in the mirror mode. The gesture-based input style being based on gestures including one or a combination of swipe, touch and hold, and the non-gesture-based input style being based on a tap on one or more buttons.

A method comprising: detecting, by an external display device, that the external display device is connected to an electronic device to display content received from the electronic device; determining whether the electronic device is currently using a gesture-based input style or a non-gesture-based input style; and automatically displaying, in response to determining that the electronic device is currently using a gesture-based input style, an augmentation bar associated with the content and supporting the non-gesture-based input style.

Alternatively or in addition to the above described method, any one or combination of the following. The determining comprising receiving an indication from the electronic device of whether the electronic device is using the gesture-based input style or the non-gesture-based input style. The determining comprising automatically determining, by analyzing the content, whether the electronic device is using the gesture-based input style or the non-gesture-based input style. The analyzing the content comprising determining whether the content includes a swipe bar associated with the gesture-based input style. The analyzing the content comprising determining whether the content includes one or more buttons associated with the non-gesture-based input style. The method further comprising automatically displaying, in response to determining that the electronic device is currently using a non-gesture-based input style, an augmentation bar associated with the content and supporting the gesture-based input style.

What is claimed is:

1. A method, implemented in an electronic device, the method comprising:
using a first input style as a current input style of the electronic device, the first input style being one of a gesture-based input style and a non-gesture-based input style; and
communicating content to be displayed on an external display device while the current input style of the electronic device is the first input style and setting a second input style for the external display device, the first input style and the second input style being different input styles.

2. The method of claim 1, wherein the first input style comprises the gesture-based input style and the second input style comprises the non-gesture-based input style.

3. The method of claim 1, further comprising:
receiving an indication of whether the external display device is touch enabled or not touch enabled, wherein the first input style is determined based on whether the external display device is touch enabled or not touch enabled.

4. The method of claim 1, wherein the external display device comprises an external monitor.

5. The method of claim 1, wherein the external display device comprises a display device of a laptop or a tablet device.

6. The method of claim 1, wherein the gesture-based input style being based on gestures including one or a combination of swipe, touch and hold.

7. The method of claim 1, the non-gesture-based input style being based on a tap on one or more buttons.

8. An electronic device comprising;
a processor implemented in hardware; and
a computer-readable storage medium having stored thereon multiple instructions that, responsive to execution by the processor, cause the processor to perform acts including:
using a first input style as a current input style of the electronic device, the first input style being one of a gesture-based input style and a non-gesture-based input style; and
communicating content to be displayed on an external display device while the current input style of the electronic device is the first input style and setting a second input style for the external display device, the first input style and the second input style being different input styles.

9. The electronic device of claim 8, wherein the first input style comprises the gesture-based input style and the second input style comprises the non-gesture-based input style.

10. The electronic device of claim 8, the acts further comprising:
receive an indication of whether the external display device is touch enabled or not touch enabled, wherein the first input style is determined based on whether the external display device is touch enabled or not touch enabled.

11. The electronic device of claim 8, wherein the external display device comprises an external monitor.

12. The electronic device of claim 8, wherein the external display device comprises a display device of a laptop or a tablet device.

13. The electronic device of claim 8, wherein the gesture-based input style being based on gestures including one or a combination of swipe, touch and hold.

14. The electronic device of claim 8, the non-gesture-based input style being based on a tap on one or more buttons.

15. An electronic device comprising:
an input style selection system to select a first input style as a current input style of the electronic device, the first input style being one of a gesture-based input style and a non-gesture-based input style; and
a communication system configured to communicate content to be displayed on an external display device while the current input style of the electronic device is the first input style and setting a second input style for the external display device, the first input style and the second input style being different input styles.

16. The electronic device of claim 15, wherein the first input style comprises the gesture-based input style and the second input style comprises the non-gesture-based input style.

17. The electronic device of claim 15, wherein the content is displayed on both the electronic device and the external display device.

18. The electronic device of claim 15, wherein the external display device comprises an external monitor.

19. The electronic device of claim 15, wherein the gesture-based input style being based on gestures including one or a combination of swipe, touch and hold.

20. The electronic device of claim 15, the non-gesture-based input style being based on a tap on one or more buttons.

* * * * *